United States Patent

[11] 3,549,011

| [72] | Inventor | Paul G. Marsh |
| | | Hamilton, Ohio |
| [21] | Appl. No. | 741,713 |
| [22] | Filed | July 1, 1968 |
| [45] | Patented | Dec. 22, 1970 |
| [73] | Assignee | The Black Clawson Company |
| | | Hamilton, Ohio |
| | | a corporation of Ohio |

[54] METHOD AND APPARATUS FOR DISPOSING OF SOLID WASTES
8 Claims, 2 Drawing Figs.

[52] U.S. Cl. .................................................... 210/71,
210/73, 210/152, 210/181, 210/260
[51] Int. Cl. ............................................... B01d 21/00
[50] Field of Search .......................................... 210/9, 63,
66, 67, 71, 73, 152, 170, 178, 179, 181, 197, 205,
208, 260; 209/10, 11, 138

[56] References Cited
UNITED STATES PATENTS

| 2,246,224 | 6/1941 | Streander ..................... | 210/152 |
| 2,846,072 | 8/1958 | Goetz ........................... | 210/67 |
| 3,211,535 | 10/1965 | Hirahara ...................... | 210/152X |
| 3,252,896 | 5/1966 | Albertson ..................... | 210/9 |
| 3,309,262 | 3/1967 | Copeland et al. ............. | 210/152(UX) |
| 3,339,851 | 9/1967 | Felton et al. .................. | 210/152(UX) |
| 3,357,793 | 12/1967 | Hanway et al. ............... | 210/152(UX) |

*Primary Examiner*—John Adee
*Attorney*—Marechal, Biebel, French and Bugg

ABSTRACT: A system for disposing of municipal wastes includes a tub wherein wastes are pulped in an aqueous medium to produce a pumpable slurry which is extracted through a screen plate to a dewatering device whence it is screw fed or otherwise delivered to a fluidized bed reactor for incineration of its solid constituents.

PATENTED DEC 22 1970  3,549,011
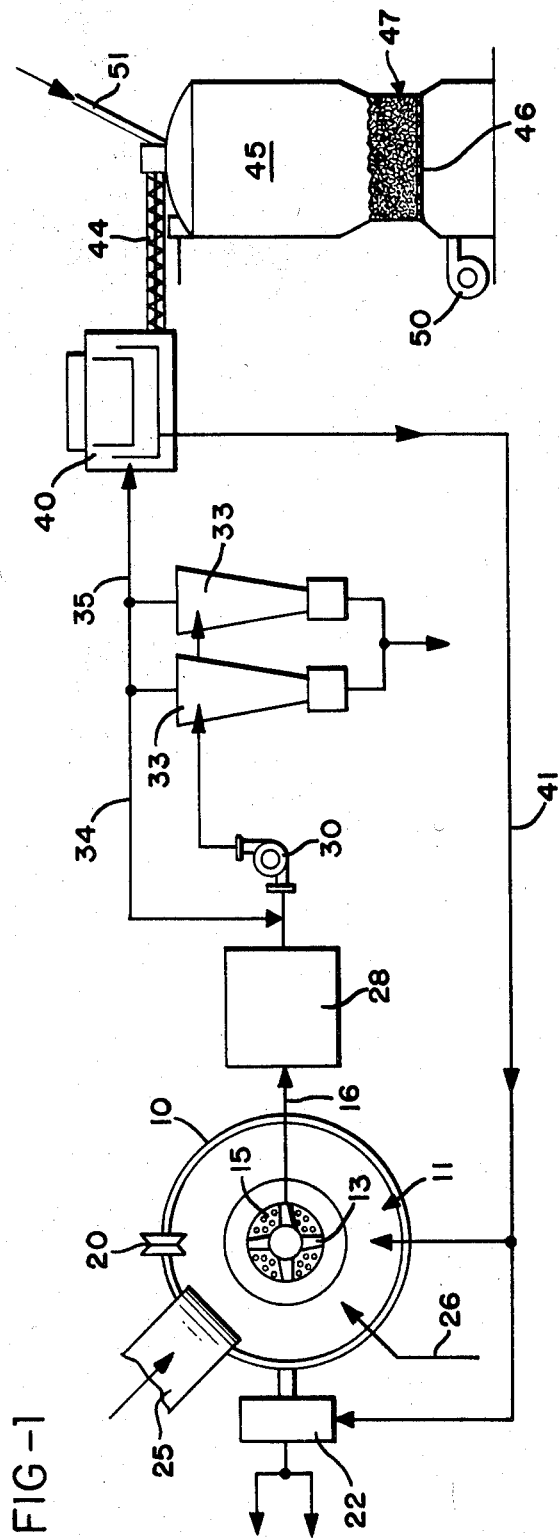
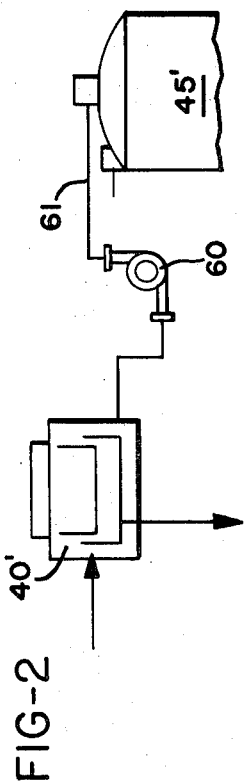
INVENTOR
PAUL G. MARSH
BY
*Marechal Biebel, French & Bugg*
ATTORNEYS 3,549,011

METHOD AND APPARATUS FOR DISPOSING OF SOLID WASTES

CROSS REFERENCE TO PENDING APPLICATION

Joseph Baxter, Jr., Ser. No. 719,197, filed Apr. 5, 1968.

BACKGROUND OF THE INVENTION

The use of fluidized bed reactors for incineration of industrial wastes has been proposed by others, and examples of typical patents include Copeland et al. 3,309,262 issued Mar. 14, 1967 and Hanway et al. 3,357,793 issued Dec. 12, 1967. Both of these patents relate to fluid bed incineration of waste sludges resulting from paper making processes, and so far as is presently known, the applications in which fluidized bed incineration has been successful for waste disposal purposes have been confined to such wastes of essentially fluid characteristics as contrasted with wastes of essentially solid characteristics.

Municipal wastes, namely the garbage and trash generated by any given community, present today the greatest problem of solid waste disposal faced by civilized mankind. It is a constantly increasing problem which has thus far not been handled successfully, but which is now being recognized as urgently in need of solution. Much of the increase in this problem is attributable to the tremendous growth in the use of paper products in the packaging and marketing of food and other consumer goods, which have resulted in enormously increased proportions of paper products in municipal trash.

The most common methods of disposing of municipal wastes in the recent past have been by landfill or by burning in either an open dump or an incinerator of some kind. Landfill is becoming increasingly impractical due both to cost and to the lack of space usable for this purpose. Conventional incinerators also have significant drawbacks including initial and maintenance cost, and the smoke and objectionable odors which emanate therefrom, and of course the latter objections apply to dump fires, along with others.

Incineration by means of a fluidized bed reactor should have significant advantages for the disposal of solid wastes, particularly municipal wastes which contain a high proportion of combustible paper and like products. Not only should such municipal wastes be capable of supporting their own combustion with a minimum of added heat, but fluidized bed reactors provide rapid and essentially complete disposal of the solid products burned therein, along with simplicity of operation, and also the special advantage of minimal tendency to emit smoke or other obnoxious vapors. So far as is presently known, however, the art has not yet learned how to use fluidized bed incineration successfully for the disposal of solid wastes, and particularly how to prepare and feed municipal wastes to a fluidized bed reactor for incineration.

SUMMARY OF THE INVENTION

The present invention is concerned primarily with the provision of a solution to the problem outlined above, and especially with the provision of methods and systems whereby solid wastes, such particularly as municipal garbage and trash, can be quickly and readily treated to eliminate the major incombustible constituents and then fed efficiently to a fluidized bed reactor for incineration. The invention is especially concerned with the provision of efficient methods and means for treating municipal wastes in preparation for fluidized bed incineration and for delivering the treated wastes to a fluidized bed reactor.

The above Baxter application discloses equipment and methods for effectively converting municipal solid wastes, such as garbage, trash and similar refuse, into a pumpable aqueous slurry capable of extraction through a perforated screen. It has been found in accordance with the present invention that the resulting extracted slurry is ideally conditioned for fluidized bed incineration, preferably after partial dewatering for greater efficiency. Apparently the pulping action carried out by the method and apparatus of the Baxter application results in an extracted slurry of such relatively homogeneous nature and such high percentage of cellulosic and other readily combustible materials as to be readily dewatered to a high solids consistency capable of being fed to a fluidized bed reactor by a screw feeder or the like, but which is also easily broken apart as it is delivered to the reactor for rapid and efficient incineration.

It is possible to pump the extracted slurry directly to a fluidized bed reactor, and such method and system may be practical for some installations. In general, however, the preferred practice is to subject the extracted slurry to relatively extensive dewatering, producing a solid consistency of 25 percent or more, and then to feed that dewatered mass to the fluidized bed reactor by a screw conveyor or similar feeding mechanism. Additionally, the invention proposes treatment of the extracted slurry for removal of at least the major portion of its gritty constituents before incineration, and preferably before dewatering while the slurry is still at minimum solids consistency.

Additional objects, features and advantages of the invention will be apparent or pointed out in the course of the detailed description of the preferred embodiment of the invention.

BRIEF DESCRIPTION OF THE DRAWING

FIG. 1 is a diagrammatic view illustrating the complete system in accordance with and for carrying out the method of the invention; and FIG. 2 is fragmentary view showing the modification of the system of FIG. 1.

DESCRIPTION OF PREFERRED EMBODIMENTS

In FIG. 1, the apparatus for pulping, compacting and separating the constituents of municipal wastes are shown as comprising a pulper 10 generally of the construction disclosed in the above Baxter application and in Felton and Vokes Pat. No. 3,339,851, issued Sept. 5, 1967 to the the assignee of this application. This pulper includes a tub 11 equipped with a rotor 13 mounted for rotation centrally of the bottom portion of the tub in cooperation with a perforate screen plate 15, and there is a compartment below the bottom of the tub into which the perforate screen plate 15 transmits particles which have been sufficiently reduced in size to pass through its perforations. For preferred practice of the invention, these perforations are of relatively small size, preferably of the range of 1/8 inch to one inch diameter, and the slurry passing therethrough is withdrawn from the pulper by the conduit 16.

As described in the Baxter application, municipal wastes and water are delivered continuously or intermittently to the pulper tub 11, as indicated by the conveyor 25 and water supply line 26, and the construction and operation of the pulper produce maximum forces of hydraulic shear in its contents, causing defibering of the paper waste material and disintergration of other wastes, both organic and inorganic. The rotor also has a mechanical action which combines with the hydraulic action to reduce the size of nondegradable waste, such as metal cans, by striking them with such force as to have the effect of rolling them into balls, and the same action causes glass bottles and other frangible materials to be quickly broken into multiple small fragments. Other metal wastes of larger sizes are also rapidly compacted, while the vortical action in the tub causes wires and other stringy or nonfibrous sheet materials to be wound into a ropelike form for ready removal from above.

Provision is made for removing each of these two classes of solid waste from the tub 11 separately from each other and from the pulpable slurry which passes through the screen 15 into the conduit 16. The stringy materials are removed by a ragger 20 as disclosed in the Baxter application and in Cowels Pat. No. 2,340,511 issued Feb. 1, 1955. The compacted metal and other hard material of too large particle size to pass through the screen plate 15 are separated from the slurry in the tub by gravity with the aid of a continuous junk remover 22, also as described in the Baxter application.

The slurry which has been extracted from the pulper 10 may be delivered by the line 16 to a storage tank 28 or directly to a pump 30 by which it is supplied to suitable grit removers, shown as a plurality of liquid cyclones 33 connected in parallel, for the removal of high specific gravity gritty particles passed by the screen plate 15. This step is not necessarily essential to the success of the invention, but it is highly desirable, particularly if the dewatering is to be carried out by a vacuum filter, since otherwise the filter would be subject to unnecessary damage if the gritty material were allowed to remain in the slurry. Additionally, it is desirable to minimize the quantity of noncombustible gritty materials which are delivered to a fluidized bed reactor.

The line 34 represents the return line by which some of the accepted material from the cyclones 33 may be delivered to the intake of the pump 30 if necessary to maintain the proper volume and pressure conditions for operation of the cyclones 33. The balance of the accepted material is transmitted by a line 35 to any appropriate means 40 for dewatering the slurry. As one example, the invention may be practiced by means of vacuum filter 40 of conventional construction, which is capable of increasing the solids content of the slurry from as low as 1 percent or less to 30 percent or more. Desirable results are also obtainable by other dewatering means, such particularly as a dewatering press, especially if it is desired to attain a relatively high solids content as efficiently as possible. With any type of dewatering means 40, it will usually be found desirable to return at least a portion of the filtrate to the pulper 10 for reuse, as indicated by the line 41 connected to deliver the filtrate to the junk remover 22 and to the pulper tub 11.

The thickened mass or filter cake produced by the dewatering means 40 is shown in FIG. 1 as being delivered by a screw conveyor 44 to the charging inlet of a fluidize bed reactor 45, which includes a 7 tapered lower portion in which an orifice plate or grate 46 supports the bed 47 of particles of sand, stone or the like. In operation, the particles comprising the bed 47 are preheated by suitable heating means (not shown) to a relatively high temperature, e.g. 1500° F, and air is blown upward through the grate 46 to fluidize the bed 47, as by means of the blower 50.

The dewatered mass or filter cake from the filter or press 40 is delivered by the conveyor 45 to the top of the reactor for downward delivery toward the fluidized bed, and it has been found that even at such high consistencies as 40 percent or more, the output of the screw conveyor 44 is readily broken up by means of an air jet nozzle 51 as it is delivered into the reactor. The solid material is initially incinerated by contact with the heated particles of the fluidized bed, and the high proportion of inflammable materials thereafter continues to support the combustion and to maintain the heat of the fluidized bed particles sufficiently to minimize the necessity for subsequent use of the external heat source. The gaseous products of combustion and the small residue of ash produced in the reactor may be disposed of by any conventional procedure. It should be noted that while the drawing shows a fluidized bed reactor of the top-charging type, the invention is equally adaptable for practice with other types of fluidized bed reactors and is in no sense limited to any specific type of fluidized bed reactor.

In the fragmentary showing of FIG. 2, a pump 60 and line 61 are connected between the dewatering means 40' and the charging inlet of the fluidized bed 45', and it is proposed that the balance of the system be as shown in FIG. 1. This modification of the system may be used if it is desired to effect less dewatering of the extracted slurry from the pulper; namely to refrain from dewatering beyond the point at which the dewatered product can be pumped, although consistencies as high as 20 to 30 percent can be pumped if their fluidity is sufficiently high. While this arrangement and procedure result in requiring disposal of a greater amount of liquid in the fluidized bed reactor, this is not necessarily a disadvantage and may in fact be entirely acceptable for some installations.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

I claim:

1. A method of treating municipal wastes which include relatively frangible and infrangible material such as fibrous and other organic materials and glass, metal and other inorganic materials comprising:
   a. depositing said municipal wastes in a tub with an aqueous medium;
   b. subjecting said wastes to hydraulic shear and mechanical degradation while in said tub to reduce said relatively frangible material to at least a preset particulate size;
   c. extracting from said tub in slurry form a portion of said aqueous medium and said relatively frangible waste materials no greater in size than said preset particulate size;
   d. subjecting said slurry to fluidized bed reaction; and
   e. removing said relatively infrangible materials from said tub separately from said slurry.

2. The method of claim 1 further comprising; separating gritty, inorganic materials from said slurry prior to said fluidized bed reaction thereof.

3. The method of claim 2 further comprising; removing a substantial portion of said aqueous medium from said slurry prior to said fluidized bed reaction thereof.

4. The method of claim 3 wherein; said step of removing said aqueous medium from said slurry is terminated while said slurry is of a pumpable consistency.

5. The method of claim 3 wherein; said step of removing said aqueous medium from said slurry is terminated after the solids content of said slurry is at least 25 percent.

6. Apparatus for treating municipal wastes which include relatively frangible and infrangible materials such as fibrous and other organic materials and glass, metal and other inorganic materials comprising:
   a. a tub and means for depositing in said tub said municipal wastes and an aqueous medium;
   b. a rotor mounted for rotation in said tub for reducing said relatively frangible materials to a preset particulate or smaller size;
   c. a perforate screen mounted in said tub and means for extracting said relatively frangible materials and a portion of said aqueous medium in slurry form from said tub through said screen;
   d. means for removing a major portion of said relatively infrangible materials from said tub separately from said slurry;
   e. a fluidized bed reactor; and
   f. means for delivering said slurry to said fluidized bed reactor.

7. The apparatus of claim 6 further comprising:
   a. means for receiving said slurry after it is extracted from said tub and removing gritty inorganic materials therefrom; and
   b. conduit means interconnecting said tub and said gritty inorganic materials removing means.

8. The apparatus of claim 7 further comprising:
   a. means for removing a portion of said aqueous medium from said slurry; and
   b. conduit means interconnecting said gritty inorganic materials removing means and said aqueous medium removing means.